US012474024B2

(12) United States Patent
Stepan et al.

(10) Patent No.: US 12,474,024 B2
(45) Date of Patent: Nov. 18, 2025

(54) LED ILLUMINATION PROFILE SYSTEM AND CONNECTING TECHNIQUE

(71) Applicant: Stepan Engineering GmbH, Mels (CH)

(72) Inventors: Peter Stepan, Mels (CH); Thomas Stepan, Maienfeld (CH)

(73) Assignee: Stepan Engineering GmbH, Mels (CH)

( * ) Notice: Subject to any disclaimer, the term of this patent is extended or adjusted under 35 U.S.C. 154(b) by 32 days.

(21) Appl. No.: 18/681,603

(22) PCT Filed: Aug. 5, 2022

(86) PCT No.: PCT/IB2022/057316
§ 371 (c)(1),
(2) Date: Feb. 6, 2024

(87) PCT Pub. No.: WO2023/012744
PCT Pub. Date: Feb. 9, 2023

(65) Prior Publication Data
US 2025/0075866 A1 Mar. 6, 2025

(51) Int. Cl.
*F21S 4/28* (2016.01)
*F21V 23/06* (2006.01)

(52) U.S. Cl.
CPC ................ *F21S 4/28* (2016.01); *F21V 23/06* (2013.01)

(58) Field of Classification Search
CPC .................................. F21S 4/28; F21V 23/06
See application file for complete search history.

(56) References Cited

U.S. PATENT DOCUMENTS 5,742,484 A * 4/1998 Gillette .................. H05K 3/363 439/83
6,027,347 A * 2/2000 Reichle .................. H05K 1/118 439/77
(Continued)

FOREIGN PATENT DOCUMENTS

AT 16836 U1 10/2020
CH 712189 A1 * 9/2017 ................ F21S 4/28
(Continued)

OTHER PUBLICATIONS

International Search Report Corresponding to PCT/IB2022/057316 mailed Nov. 14, 2022.
(Continued)

*Primary Examiner* — Mary Ellen Bowman
(74) *Attorney, Agent, or Firm* — Finch & Maloney PLLC

(57) ABSTRACT

The invention relates to an illumination system (80) comprising at least one conductor-bar-free assembly profile rail (60) for accommodating at least one lighting unit (70) that is insertable into the assembly profile rail (60), and at least one supply connector (50) that is insertable into the assembly profile rail (60). In this case, the assembly profile rail (60) is in the form of an extruded plastics or aluminum profile and the lighting unit (70) is in the form of a long rigid strip which has at least one semiconductor light source (71) on its front surface and at least two exposed, continuous contacting conductor tracks (74) on its back surface. The lighting unit (70) further comprises a housing element (73) which is designed to be mechanically couplable to the assembly profile rail (60) and which is used to hold the lighting unit (70) in the assembly profile rail (60). The supply connector (50) comprises contact devices (52), by means of which it is possible to establish electrical coupling of the contacting conductor tracks (74) of the lighting unit (70) to those of a further lighting unit (70) and/or to a supply
(Continued)

cable (67), and further comprises a housing element (**56*b*) which is mechanically couplable to the assembly profile rail (60) or to the lighting unit (70) and which is used to hold the supply connector (50) in the assembly profile rail (60**).

22 Claims, 5 Drawing Sheets

(56) References Cited

U.S. PATENT DOCUMENTS

| | | | | |
|---|---|---|---|---|
| 10,323,837 | B2 * | 6/2019 | Hierzer | F21V 21/35 |
| 10,446,787 | B2 * | 10/2019 | Lang | F21V 17/101 |
| 2013/0182422 | A1 * | 7/2013 | Guilmette | F21V 21/30<br>362/217.05 |
| 2014/0265809 | A1 * | 9/2014 | Hussell | F21V 23/06<br>313/3 |
| 2016/0033098 | A1 * | 2/2016 | Bergman | F21S 8/061<br>362/418 |
| 2019/0316765 | A1 * | 10/2019 | Lin | F21V 23/06 |

FOREIGN PATENT DOCUMENTS

| | | | |
|---|---|---|---|
| DE | 10 2008 013 454 | A1 | 7/2010 |
| DE | 10 2012 005 982 | A1 | 9/2013 |
| DE | 10 2013 208 400 | A1 | 11/2013 |
| DE | 10 2014 103 974 | A1 | 9/2014 |
| DE | 10 2016 119 987 | A1 | 4/2018 |
| DE | 202019100511 | U1 | 2/2019 |
| EP | 0 162 124 | A1 | 11/1985 |
| EP | 2 827 053 | A1 | 1/2015 |
| EP | 3 312 506 | A1 | 4/2018 |
| EP | 3 336 420 | A1 | 6/2018 |
| EP | 3 427 555 | B1 | 1/2019 |
| WO | 97/15965 | A1 | 5/1997 |
| WO | 2014/045494 | A1 | 3/2014 |
| WO | 2015/183848 | A1 | 12/2015 |
| WO | 2019/243225 | A1 | 12/2019 |
| WO | 2020/194236 | A1 | 10/2020 |

OTHER PUBLICATIONS

Written Opinion Corresponding to PCT/IB2022/057316 mailed Nov. 14, 2022.

International Search Report Corresponding to PCT/IB2021/057271 mailed Jun. 17, 2022.

Written Opinion Corresponding to PCT/IB2021/057271 mailed Jun. 17, 2022.

Invitation to Pay Additional Fees Corresponding to PCT/IB2021/057271 mailed Apr. 26, 2022.

* cited by examiner

LED ILLUMINATION PROFILE SYSTEM AND CONNECTING TECHNIQUE

This application is a National Stage completion of PCT/IB2022/057316 filed Aug. 5, 2022, which claims priority from International Application PCT/IB2021/057271 filed Aug. 6, 2021.

FIELD OF THE INVENTION

The invention relates to an illumination system with LEDs, which are arranged in a mounting profile rail, and to an electrical terminal connection system of this LED profile system, together with its components and their installation. In particular, it relates to an illumination system in accordance with the independent claim(s) and/or a terminal connection system, together with an associated method for the terminal connection and installation of such an illumination system.

BACKGROUND OF THE INVENTION

LED light profiles or LED illuminant profiles in a wide variety of forms of embodiment are of well-established prior art. For example, EP 3 336 420 shows an illumination system with a channel that has a permanently mounted power supply rail in its interior. Electrical connectors are attached to the lighting units that are to be mounted in the channel, before the latter are installed. These connectors are designed to provide a mechanical coupling between different sections of the channel, and also to couple the power rail sections of the power rail electrically to each other, and to establish electrical contact between the power rail and the lighting unit.

EP 3 312 506 shows a light-emitting diode strip with a flexible profile made of extruded plastic that is open on one side, and two electrical cables integrated inside a wall of the profile, which run parallel to each other in the wall and at the ends have plug-in connectors or free wire ends for purposes of linking the light-emitting diode strips to each other. Recesses up to the electrical cables in the wall form contact surfaces for the terminal connection of flexible cable carriers with chip light-emitting diodes arranged on the latter. The flexible cable carriers with the chip light-emitting diodes are protected from moisture or the effects of the weather by a transparent or translucent sealing compound that fills the inside of the profile. The flexible cable carriers are connected in parallel with the electrical cables, wherein the total current flows through the cables of the profile connected by means of plug-in connectors or free wire ends, and wherein the light-emitting diode strip is flexible in a direction vertical to the extensive direction.

DE 10 2014 103 974 shows a power rail for the terminal connection of light-emitting diodes, in particular of LED boards, consisting of a carrier profile with integrated electrical conductors for the electrical terminal connection of the LED light sources. The carrier profile is a one-piece extrusion moulding, in which the electrical conductors consist of conductor tracks arranged on the extrusion profile in a materially-bonded and/or form-fit manner.

DE 10 2013 208 400 describes an LED strip without a housing, with a flexible conductor film, on which LEDs and corresponding conductor tracks are provided. By the "piercing" of contact points at regular intervals on the LED strip, each LED is pierced separately into a flat cable provided as a power rail so as to establish contact.

The disadvantage of these solutions of known art is that they have a complex and static structure and have little flexibility, for example, but not only in terms of the electrical terminal connection. Their installation, that is to say, the manipulation during installation, is also complex and time-consuming, in particular when it comes to adjustment of length and/or shape. For example, their installation can also be difficult in many aspects or installation situations, in particular if structural tolerances are not adhered to, or if retrofitting involves predetermined conditions that were not fully known about beforehand. In most cases, prefabrication by the manufacturer or supplier is required. Transportation of the profiles to the installation site is time-consuming, in particular if the illumination is to extend over longer lengths. The systems are also often either not very modular, or have a large number of different components, which makes warehousing, configuration, ordering, etc. more difficult. Neither unconfigurable, static prefabricated illumination systems, nor complex modular systems with many special parts, are conducive to efficient warehousing, despatch, installation, etc. It should also be possible for the parts of the system to be produced in an unbroken process by one manufacturer, requiring none, or few, of the usually manual, intermediate installation steps; the system should preferably be delivered to the end customer by the more specialised raw material supplier for aluminium, plastic, electronics, etc. with no, or only a few, processing steps. The object of the present invention is therefore to create an improved device, or an improved system, which does not have the aforementioned disadvantages; what is sought, in particular, is an improved LED profile, or a terminal connection system, for an LED profile with very small dimensions. One example of a specific design has a cross-section of around 15 to 40 mm in width and height. The aim is to have small dimensions in the design, but still to allow relatively high currents. This means that long lengths can be implemented without an additional power supply. The aim is to provide a simpler, and in its embodiment a more flexible electrical terminal connection system for the profiles, which also enables a good and flexible configurability of the LED profiles, particularly in the course of their production and/or installation.

Here a variety of requirements for the electrical terminal connection system, which arise depending on the form of embodiment or configuration of the profile, or the configuration of the installation location, should be covered as flexibly as possible by a common system, e.g. with regard also to length adjustments, divisions, angles, cable outlet positions at the installation location, etc.

SUMMARY OF THE INVENTION

The aim is also to achieve a terminal connection system that can preferably be produced without the use of tools, or with minimal use of tools, and that can preferably also be easily disconnected for purposes of servicing. One object is to provide a type of flexible modular system to provide contact with, that is to say, the electrical connection of, LED profiles. For example, it should be possible to cut most parts to length manually, e.g. using cable duct shears that are to hand, and then to process these parts further (preferably both) directly, without further machining.

The object is achieved by means of the features of the independent claims. Advantageous developments are presented in the figures and in the dependent claims. The inventive system makes it possible to produce the individual sections in units of e.g. 3.0 metres, which are optimal for transportation. Advantages in loading and shipping in the wholesale sector ensue, as the shipping of longer units is technically difficult and therefore expensive.

In accordance with the invention, an illumination system is provided, comprising at least one mounting profile rail, without a power rail, for the accommodation of at least one lighting unit that can be introduced onto the mounting profile rail, and at least one supply connector that can be introduced onto the mounting profile rail.

Here the mounting profile rail is designed as an extruded plastic or aluminium profile. A profile in accordance with the invention preferably has a length of at least one metre. and a cross-section with a width and a height in each case in a range of approximately 15 to 50 mm, preferably approximately 20 mm or 25 mm. The profile has an essentially U-shaped or H-shaped cross-section. It therefore takes the form of a conventional extruded profile that does not require any particular post-processing or assembly with other components, and can, for example, be processed further directly by the manufacturer.

The lighting unit is designed as a long inflexible/rigid strip, for example with a length at least 10 times greater than the width and/or height. It is therefore long and flat, e.g. in the form of a strip or panel; in other words it is essentially cuboid with a width of 10 to 50 mm, a height of 1 to 15 mm and a length of more than 100 mm, preferably more than 300 mm, for example 560 mm or 1,400 mm.

At least one semiconductor light source, preferably a plurality of, that is to say, a series of semiconductor light sources such as LEDs, is mounted on the front surface of the lighting unit.

At least two exposed, continuous contacting conductor tracks are formed on the rear surface of the lighting unit. Ideally, three exposed conductor tracks are formed, as this provides protection against polarity reversal (reverse polarity protected).

The lighting unit also has a housing element, which can be mechanically coupled to the mounting profile rail, and with which the lighting unit is held in the mounting profile rail; in particular it can be snapped or clipped onto the latter with spring-loaded elements.

The supply connector of the illumination system has contact devices, by means of which an electrical coupling of the contacting conductor tracks of the lighting unit with those of another lighting unit, and/or with a supply cable, can be produced, or takes place. This creates an electrical coupling between the supply connector and one or two of the lighting units.

The supply connector also has a housing element, which can be mechanically coupled to the mounting profile rail or to the lighting unit, and with which the supply connector is held in the mounting profile rail. This can also be embodied such that the supply connector is only coupled to the housing 73 and not to the profile 60. In another form of embodiment, the supply connector can be mechanically coupled to the lighting unit, or specifically to its plastic cover/diffuser, and thereby can preferably have no mechanical connection to the mounting profile rail.

The illumination system is preferably designed such that supply connectors introduced onto the mounting profile rail electrically couple a plurality of subsequent lighting units in the mounting profile rail, which are also introduced onto the mounting profile rail, wherein the supply connectors and lighting units can be arranged so as to overlap each other in each case within the mounting profile rail. This makes it easy to assemble and configure the illumination system, in particular with little or no use of tools. At the same time, a safe and flexible electrical coupling is created.

The housing element of the lighting unit is preferably designed as a diffuser, or linear optics, or with Fresnel lenses, and/or is designed to provide contact protection (ESD) and mechanical protection of the electronic components as well as the light guidance, or itself also serves to guide the light. The housing element can also be made from transparent, clear plastic, which is clipped over the lighting face of the lighting unit, or which is pushed onto the latter. This protects the lighting elements from damage. An advantageous illumination and light distribution can also be achieved.

In one form of embodiment, both the supply connectors and the lighting unit are preferably mechanically connected to the mounting profile rail, but not to each other. In particular, this connection can take place using snap-on hooks or similar. This means that during installation, the profile can first be adjusted in length and installed, the supply connectors can then be clipped onto it, and an electrical supply provided by way of at least one of these; the lighting elements can then be clipped into place over the supply connectors, which can also be cut to length as necessary. A supply connector is positioned at each of the butt joints between the lighting units.

The mounting profile rail and the lighting unit can preferably have different lengths. For example, a length grid pattern for the mounting profile (typically 1 m, 2 m, 2.5 m, 3.0 m) can differ from the length grid pattern for the lighting unit (typically 560 mm or 1.4 m). In other words, the mounting profile can be shortened and/or divided apart to any length, and the lighting unit can be shortened at least into a predetermined grid pattern.

The lighting unit is preferably designed as a long and flat, two-sided rigid PCB, together with the semiconductor light sources and a control circuit. In particular, the semiconductor light sources on the lighting unit can here be covered or moulded with a plastic protective cap.

The conductor track cross-sections on the supply conductor tracks can preferably have a conductor cross-section with the following geometry: thickness: 0.035 mm to 0.35 mm, preferably 0.07-0.14 mm, e.g. 0.1 mm; width: 5 mm to 20 mm, preferably 7.5 mm-12.5 mrn, e.g. 10 mm. In one form of embodiment, the PCB of the lighting unit has, on the rear surface with the supply conductor tracks, a first conductor track layer thickness that is greater than that on the front surface with the LEDs. For example, there can be a copper thickness of 0.035 mm to 0.35 mm, preferably 0.07-0.14 mm, e.g. 0.1 mm, on the rear surface, and 0.01-0.035 mm on the front surface. Alternatively, the conductor track layer thickness on the front surface can also be identical to that on the rear surface. They can also be plated through, so that both conductor tracks carry the power line simultaneously.

The lighting unit is preferably designed such that it can be shortened in accordance with a predetermined marked-out grid pattern, in particular from 20 mm to 100 mm, in particular, 30 mm to 50 mm, or 50 mm to 70 mm. For example, it can be sheared off by means of blades that move relative to each other (e.g. with cable duct shears or similar). Optionally, the PCB can also be designed with a predetermined breaking point, and/or the grid pattern can be marked-out on the PCB. Each grid element can preferably be operated on its own autonomously. Optionally, the circuit within a grid element can also be designed such that it can be shortened further without any loss of function—wherein the remainder must be disposed of by the start of the next grid element—for example, the control circuit is in each case arranged at the start of the grid element, The supply connector, when introduced, is preferably designed to slide in the longitudinal direction of the mounting profile rail. This means that after insertion onto the profile, it can be pushed along the profile into a correctly overlapping position before the lighting element is introduced.

The supply connector-contacting conductor track pairing is preferably designed to be protected against reversal of polarity, wherein in particular the contacting conductor tracks and/or the supply connector-contact devices are arranged with mirror symmetry. This means that the polarity does not need to be taken into account in the course of installation, even in the case of a DC supply.

The supply connector is preferably designed with two ends, each with a first and a second spring contact, which are electrically connected to each other. This enables a safe, reliable contact to be established, even in the event of installation-related inclined positions.

At least one of the supply connectors is preferably designed as a "corner supply connector" with an angle of 90°, with which the lighting units in two mounting profile rails can be connected around a corner.

At least one of the supply connectors is preferably designed as a "flexible supply connector", in which there is a flexible cable connection between a first supply connector end and a second supply connector end. This allows connections to be made at any angle.

At least one of the supply connectors preferably has a spring-loaded terminal for a cable as a "terminal connection unit"; this is designed to connect the lighting unit electrically to a terminal connection cable from a power supply. Optionally, each supply connector can also be designed with cable connections in order that it can be introduced flexibly.

The supply connector preferably has a further housing element, which is designed to create geometrically-defined mechanical coupling between two mounting profile rails, in particular at an angle of 0 degrees or 90 degrees. This can be produced, for example, by way of appropriately designed contact surfaces for the profile. At the same time a stable connection of the profiles can be established.

The illumination system preferably comprises at least one separate profile connector element, which is designed to create a geometrically defined mechanical coupling between two mounting profile rails, in particular at an angle of 0 degrees or 90 degrees. This can be produced, for example, by way of appropriately designed contact surfaces for the profile.

The electrical supply connector for the electrical connection, that is to say. the supply of a lighting unit installed in the mounting profile rail, preferably has:

- An electrical PCB (printed circuit board) or an over-moulded lead frame, with at least two electrical spring contacts on an under surface. These spring contacts are designed and arranged to provide an electrical supply to the lighting unit when the connector is installed.
- Optionally, a cable outlet with at least two cable connections on an upper surface opposite the under surface, which is designed to be connected to a power cable for the electrical supply of the lighting unit.
- A retaining device, in particular a clip element, snap-on element, or magnet, which is designed to snap onto a profile system (60). For example, with sprung latching lugs, which when installed (preferably without tools, e.g. can be released again by applying force) engage in a recess on the profile system, preferably within the profile system.

In particular, the retaining device can be a plastic part with at least one spring-mounted clip or snap-on element. This is assembled in one piece with the PCB to form the electrical connector, e.g. with a snap-on connection, a form-fit connection, by adhesive bonding, or by injection moulding. Here the holding devices are preferably designed such that they can be moved relative to the profile axis on the electrical terminal connection element in the assembled state, preferably without requiring much force.

The spring contacts are preferably designed and arranged with PCB spring contacts to protect against a reversal of polarity. A plurality of these spring contacts can preferably be arranged, electrically connected to each other, so as to establish contact with the same electrical pole. For example, there can be at least three PCB spring contacts, preferably arranged with mirror symmetry about a central axis, and electrically connected symmetrically about this central axis, preferably in the form of high-current spring contacts, or high-current spring fingers, similar to those used, for example, for establishing contact with batteries in mobile devices. This ensures a simple and reliable establishment of contacts, in particular at higher currents.

The cable connections are preferably designed as spring-loaded terminals, insulation displacement terminals, and/or soldering lands on the PCB, or in the over-moulded lead frame, (or are designed as connectors). This means that a cable, which, for example, may already be drawn up into a ceiling, can be attached to the electrical connector directly on site for purposes of power supply.

The invention also relates to an electrical terminal connection element, which is constructed with at least one electrical supply connector, as described above. In particular, this can have a cable outlet leading laterally or upwards in relation to the profile for purposes of terminal connection to a supply voltage.

The invention also relates to an electrical connector element, comprising two electrical supply connectors, as described in this document, which are connected to at least one cable, in particular a multi-pole cable. The cable is preferably flexible, e.g. a stranded cable, and can be constructed as a two-pole or a multi-pole cable, or preferably from a plurality of individual strands. In particular, this can be used to provide a connection for at least one, and optionally a plurality of, safety low DC voltages for purposes of supplying the LEDS with an operating voltage. Optionally, a data connection can also be provided for bus control of the LEDs, in particular this is also reverse polarity protected or tolerant, in particular with a symmetrical terminal connection arrangement on the plug and/or socket side.

This enables a preferably flexible connection to be made between a plurality of profiles, which can preferably also be routed around angles or corners thanks to the flexibility. With the already described ability to move the electrical connector elements (along the profile and relative to the electrical terminal connection elements), a simple installation can be provided, as the profiles can still be moved relative to each other after electrical connection by sliding the electrical connector elements along the electrical terminal connection elements. This electrical connector element can in particular be designed so as to establish an electrical connection between two inventive electrical terminal connection elements, which are described here.

The invention also relates to an electrical supply connector element with an over-moulded lead frame, or a PCB, with at least a first group of at least two spring contacts on an under surface, and a second group of at least two spring contacts on the under surface, which in each case are electrically connected to the respectively related spring contacts of the first group. Furthermore, the electrical connector element has a (preferably plastic) clip element, which is designed to snap onto the mounting profile rail. The first group establishes contact with a first lighting element, and the second group establishes contact with a second lighting element, which means that they are electrically connected to each other when in the installed state.

At least one first and one second longitudinal web or longitudinal groove is preferably formed on each side face of the mounting profile rail, wherein the first is designed to accommodate the supply connector mechanically, and the second is designed to accommodate the lighting unit.

An additional diffuser is preferably mounted in front of the lighting unit, in or on the mounting profile rail, in particular it is snapped into place. Here the diffuser can be provided as a "flat, continuous" strip, e.g. from a roll, in particular, as an extruded profile made from a plastic such as PMMA or PC.

A third longitudinal web or longitudinal groove is preferably formed on each side surface of the mounting profile rail for the accommodation of the diffuser.

Thus, in accordance with the invention, an electrical terminal connection system is provided, designed for the electrical supply of a linear LED lighting unit, which is fixed in a profile system; for example, in an illuminant profile for the illumination of a room or building, in which a series of LEDs are arranged on the inside in an essentially U- or H-shaped profile made from metal, plastic, etc., preferably by simply clamping, pushing or clipping the electrical connection onto the profile, preferably without the use of adhesive.

Here a modular construction, and a flexible, simple adaptability to on-site conditions, are key aspects. For example, the profiles are preferably adapted on site in each case to the local conditions of the construction site, or the room, by adjusting, for example, their length, cutting them at an angle, and connecting them in the vicinity of an existing power outlet, etc. It is preferable for recourse to be made to a standard modular system with preferably few parts that can be flexibly introduced, and the parts in this modular system should also be easy to transport. They should also be easy to assemble and customise, preferably without the use of special tools, and in just a few operational steps.

The inventive system also allows, without great effort, the use of a plurality of supply points along an LED profile illumination system, to compensate, for example, for the voltage drop along the LED strip, using a plurality of supply cables. Here the plurality of supply points is flexible, and the exact positions of the cable outlets are not important, as the terminal connection system provides tolerances and variability in the axial direction.

The lighting units in the system in accordance with the invention are designed as strips, or are strip-shaped—i.e. flat and elongated—printed circuit boards made of an insulating material such as, for example, printed circuit board materials of known art such as FR4, FR3, etc., on or in which flat, metallic conductor tracks are formed. The exposed conductor tracks, in particular on the rear surface, can be designed as gold-plated contact surfaces with which electrical contact can be established. The lighting unit is preferably operated with a very low voltage or SELV, for example with 12 V, 24 V, or 48 V, in particular using direct voltage (DC).

The number of conductor track strips preferably corresponds to the number of poles or connections of the LED strip. In a particular form of embodiment, one pole of the supply can also be routed by way of the metal profile system itself, and, accordingly, the electrical terminal connection element can also have one less pole, e.g. therefore, only one single pole or conductor track strip.

Here the LED lighting units are preferably PCB strips or . . . , on which LEDs and possibly at least some of their control circuitry are mounted. PCB strips or tapes can be separated into sections in discrete lengths, usually at defined cut-through points, so that their length can be adjusted in discrete steps in a grid pattern. The cut-through points are preferably visually marked-out. Here, each grid element can preferably be designed to be operable autonomously, e.g. each has its own electronic control circuit for the LEDs—even if these can be configured together, as described, for example, in WO 2020/194236 for flexible LED strips, which is hereby incorporated as a reference, in particular with regard to this aspect.

In accordance with the invention, electrical supply connectors can be plugged, snapped, or clipped, onto the inside of the profile. In an optional form of embodiment, they can also be attached onto the lighting unit or its housing element. Here the supply connectors can be attached such that a snapped-on electrical connector on the electrical terminal connection element can be moved along the profile direction. This allows a terminal connection system to be provided that is flexible in its position and can be adapted to the conditions during installation or fitting, for example, or compensation can be made for build tolerances in the cable outlet or similar. Installation can also be simplified if the terminal connection cables have room to manoeuvre in the longitudinal direction as the profile is guided towards the ceiling. This allows the terminal connection cable to be pushed onto the profile, since the supply connector that is connected to it can move in the profile and continue to fulfil its function.

The longitudinal conductor tracks on the rear surface are preferably designed as at least three symmetrically arranged longitudinal conductor tracks. In particular, at least one central contact carries a negative pole of an LED supply voltage and at least one—preferably both—outer contacts each carry a positive pole of the LED supply voltage. In particular, the positive pole and negative pole are each electrically connected to the associated longitudinal conductor track of the lighting unit. In particular, the conductor tracks are designed with a sufficient cross-section, in particular with a sufficient width, to conduct the currents required for the LEDs, but at the same time with sufficient distances from each other, and from the edge, to avoid short circuits, and to enable secure contacts by plugging on the terminal connection system connector. The conductor tracks, in particular at least on the rear surface of the lighting unit that is not populated with LEDs, can also have a layer height of 200 μm or more. In accordance with the invention, this allows significantly higher currents to be transported and there is a significantly lower voltage drop.

The longitudinal conductor tracks in the supply terminal connection-length region are preferably provided in a reverse polarity protected arrangement, in particular one that is symmetrical about a longitudinal central axis of the lighting unit PCB strip. This provides reverse polarity protected contacts, in which it does not matter in which direction a contacting terminal connection system connector is plugged on, or in which orientation the lighting unit is introduced. In addition to the convenience and avoidance of terminal connection errors, this also allows the cable outlet to be positioned on either the one surface or the other. This symmetry, or reverse polarity protection in the electrical sense, can here be provided either by the electrical terminal connection element, or by the electrical connector that establishes contact with it, or by both components. Designs in which the (electrical) symmetry is produced by the electrical connector may involve less design effort, in that, the associated electrical terminal connection element does not necessarily also have to be (electrically) symmetrical, which means, for example, that structurally complex crossings of conductor paths on the lighting unit can be avoided (optionally, however, optical symmetry can still be formed, e.g. to make the polarity reversal safety apparent to the user).

The invention also relates to an LED illumination profile, in particular as an extruded aluminium profile, and with at least one electrical connection system that is described here. The aluminium profile can in particular be designed in a U-shaped or H-shaped basic form, in particular with two side walls and a preferably continuous transverse web connecting the side walls in the interior, which is spaced apart from the edge of the side walls. The profile has longitudinally continuous grooves or webs in the interior on the side walls; these are designed to hold the supply connectors, lighting units, and/or the optional diffuser, or a cover.

The invention also relates to an LED illumination system with a preferably translucent (e.g. opaque or opalesque) cover and at least one LED illumination profile as described here. Preferably, this LED illumination system comprises at least one end cap for the aluminium profile.

The invention also relates to a method for the mounting or connection of an LED illumination system to a supply voltage, which comprises:

- Installation of one or a plurality of mounting profile rails of the illumination system at a mounting location. Here the profiles can be shortened to any length, and/or joined together. They can also be guided around corners at any angle, for example by way of mitre cuts. Here one or a plurality of holes can also be introduced onto the profile to allow the inlet of one or a plurality of supply cables. The profile can, for example, be screwed, clipped or clamped to a wall, ceiling, or suspended structure. Since the mounting profile rail does not feature a power rail, its mechanical processing is uncomplicated.
- Introduction of at least one of the described electrical supply connectors onto the mounting profile rail. Here at least one of the supply connectors is connected to the supply cable, e.g. by way of an insulation displacement terminal or a spring-loaded terminal. Here the supply connector is held by an appropriately designed housing element of the mounting profile rail, that is to say, it is mechanically connected, for example by way of at least one sprung nose, a clip, or similar. The supply connector can preferably be moved in the longitudinal direction of the profile.
- Introduction of at least one of the described lighting units onto the mounting profile rail, above the supply connector, so that the latter establishes contact with the continuous supply conductor tracks on the rear surface of the lighting unit. Here the lighting units can be shortened at least in a predetermined grid pattern, and/or joined together in length in order to be adapted to the length of the profile. A supply connector is in each case introduced beforehand at butt joints such that it overlaps the two abutting lighting units. At the same time the lighting units are also clipped onto the mounting profile rail, that is to say, are mechanically connected to the latter. Optionally, a mechanical connection can also be made to the supply connector, but this is not provided in the preferred form of embodiment. The lighting unit can also have a housing element for clipping onto the profile, which housing element can also fulfil optical functions such as light distribution, diffusion, etc.
- A translucent cover/diffuser is preferably then mounted on the mounting profile rail, also preferably by snapping it into place.

Many advantages can be implemented with the present invention, for example:

- Continuous illumination with corner connections, with simple contacts established by way of a flexible connector element;
- Simple installation on the ceiling thanks to flexible or moveable connections;
- Variable position of the supply point;
- It would be possible to move in terminal connection cables in advance in the course of construction. Until now, the terminal connection cables have been permanently mounted on the profile. This also simplifies the packaging and transport of the profiles and, on the other hand, results in trouble-free handling at the construction site during the illuminant installation. Interfering cable sections are eliminated.
- Simple compensation for the voltage drop over long profile lengths (in particular of the LED strip), with multiple supply points, allowing high outputs over long lengths;
- Supply to the LED profile with a hole at any point on the rear surface or side of the profile;
- Simple configurability, even of LED illumination profiles with a more complex shape during installation;
- The profile can be easily cut to length (by sawing, cutting, . . . ) as there is no power rail or similar in it, which would require rework and particular care.
- Compact design, which also enables use with small profiles (e.g. 10 mm);
- reverse polarity protection;
- tool-free terminal connection.
- Another advantage is that the terminal connection element does not have any protrusions, as is the case, for example, with a conventional cable that is plugged in or soldered to the flexprint. This also means that there is no shadowing or interference with the light emitted by the LED.
- Another advantage is that no cable is mounted directly on the profile. As a result transport and storage become easier. Strain relief of the terminal connection cable, which is difficult with small profiles, is no longer necessary.
- In addition, the profile is easier to manipulate during installation as there is no cable on the profile.
- Another advantage of the inventive system is that individual elements can easily be replaced during service and maintenance work. This can also be carried out by unskilled persons. The system therefore also complies with the Ecodesign Directive 2009/125/EC and therefore also with the minimum requirements for reparability.

Further advantages, features and details of the invention ensue from the following description, in which examples of embodiment of the invention are described with reference to the figures.

The list of reference symbols, as well as the technical content of the patent claims and figures, forms part of the disclosure. The figures are described in a coherent and comprehensive manner. Identical reference symbols indicate identical components, reference symbols with different indices indicate components with identical or similar functions.

BRIEF DESCRIPTION OF THE DRAWINGS

Here.

DETAILED DESCRIPTION OF THE PREFERRED EMBODIMENTS

Figures 1A, 1B:
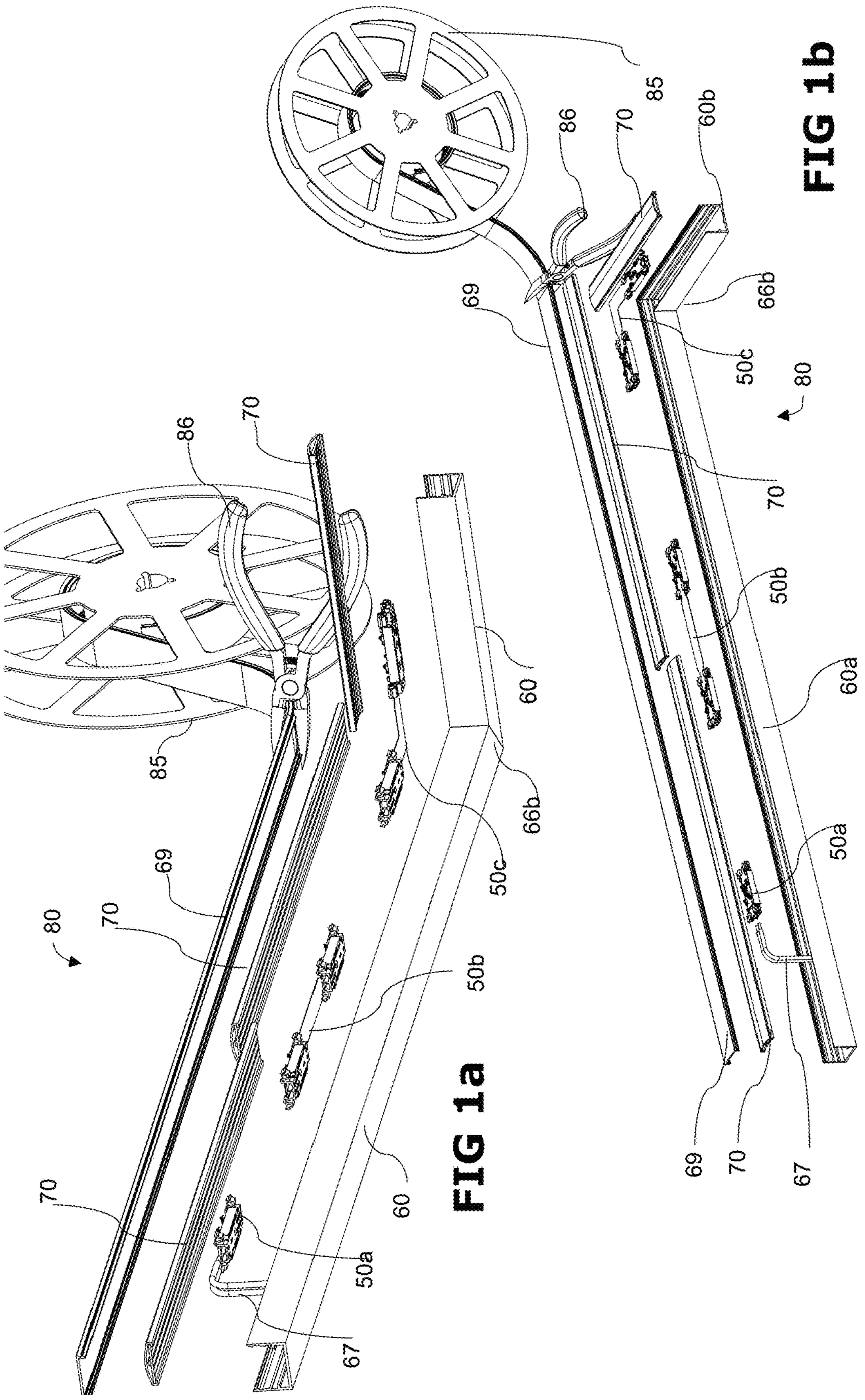
FIGS. 1*a* and 1*b* show an example of a form of embodiment of an inventive illumination system for an LED illumination profile in differing perspective (exploded) views.

FIG. 1*a* shows inventive components of an LED illumination system 80 for the emission of light by way of a light cover 69, as seen in an exploded view from the rear side of the profile, that is to say, the terminal connection side. The mounting profile rail 60, also referred to as profile 60 for short, is designed, for example, as an aluminium profile with a U-shaped, alternatively also an H-shaped, cross-section, which can be connected on the end face to an end cap, or terminal connection cap, or to a further profile. The illumination system 80 is supplied with electricity by way of a cable 67, preferably but not necessarily with a separated extra-low voltage (SELV) of, for example, 48 V, 24 V, 12 V, or 5 V. This cable 67 is electrically connected to an inventive electrical supply connector 50*a*, as a type of plug-in element, which is designed to be attachable to the profile 60 by way of clip elements 56, preferably in a form that can later be detached. The current is conducted from the cable 67 to an inventive lighting unit 70 by way of this electrical supply connector 50*a*, also referred to as the connector 50 for short. In the mounted state the electrical connector 50 can here preferably be moved along the profile axis in the profile 60, and/or along the lighting unit 70, for example in order to be able to stow the terminal connection cable 67 in the profile, or to readjust the position in the course of the installation. After the connector 50 has been introduced, the lighting units 70 are also clipped onto the profile 60. Since the profiles 60 are usually longer (e.g. 2 m, 2.5 m, 3 m, 4 m, or 5 m) than the lighting units 70 (e.g. 0.56 m, 1.4 m, etc.), an electrical connection between the lighting units 70 is inventively produced with a further supply connector 50*b* that is introduced onto the profile. This can also take place around a corner 66*b*, or by way of a butt joint, as shown in the case of supply connector 50*c*. The lighting unit 70 around the corner is here shortened to the profile length in accordance with its grid pattern. To improve the light emission, as protection and/or for better optics, a translucent cover 69, for example in the form of a diffuser or an optical element, can also be mounted on the mounting profile rail. In the example shown, the diffuser is provided on a roll 85 and its length is adjusted on site using cable duct shears (alternatively also using pliers or shears with a saw or a knife, etc.).

FIG. 1*b* shows the same inventive illumination system 80 as before, but viewed from the front of the profile, that is to say, the lighting side. The elements shown have already been described above, or will be described in detail in what follows. In accordance with the invention, a plurality of profile elements 60 can also be connected to each other, electrically and/or mechanically. On the right-hand side of the figure is an angled profile connection 66*b* with a rigid connecting element 50*c* between 60*a* and 60*b*. Particularly in the case of longer profiles, instead of or in addition to a connection, inventive supply points can also be implemented with connectors 50 at any number of advantageous points. This means that the lighting can also be switched on and off in sections.

The corner joint 66*b* shown in the example has a right angle. In order to implement other angles in accordance with the invention, the profiles need only be cut at a different angle; no further modifications are absolutely necessary. Shown here is a form of embodiment in which a rigid corner supply connector is mounted on the profile system 60; this is electrically connected to the respective electrical terminal connection conductor tracks of the lighting units 70 on both sides.

Figures 2A, 2B, 2C:
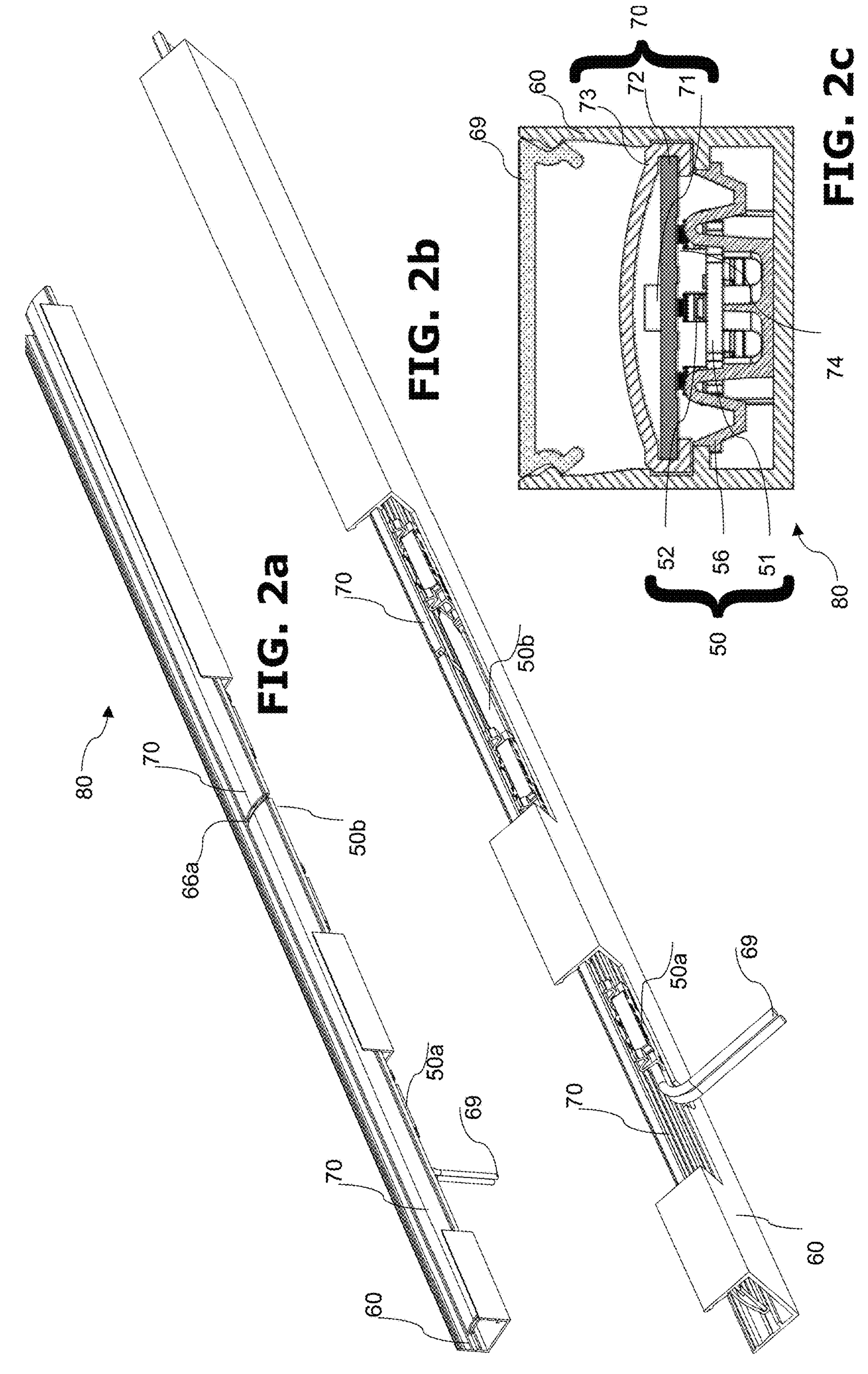
FIG. 2*a* shows a view of a form of embodiment of an inventive illumination system in a partial cross-section from the front.
FIG. 2*b* shows a view of a form of embodiment of an inventive illumination system in a partial cross-section from the rear.
FIG. 2*c* shows a cross-section of an exemplary form of embodiment of an illumination system.

FIG. 2*b* and FIG. 2*c* each show in perspective a partial cross-sectional view of an inventive illumination system 80, with the components that have already been explained above.

FIG. 2*c* shows a cross-sectional view through a supply connector 50 in the assembled illumination system 80. Here the supply connector 50 is held in the mounting profile rail 60 by its sprung latching lugs or hooks 56, which are designed as housing elements. Its printed circuit board (PCB) 51 carries the spring contacts 52 and is fixed in the plastic housing, e.g. in a form fit or a force fit, either clipped or snapped-in, or bonded or moulded in. The spring contacts establish contact in each case with the rear surface longitudinal conductor tracks 74 of the lighting elements 70, so as to supply the latter with power. As shown here, these lighting elements 70 are also to be supplied with power in the mounting profile rail 60 by way of a translucent plastic cover 73. As shown here, these lighting elements 70 are also fixed in, that is to say, snapped onto, the mounting profile rail 60, by way of a translucent plastic cover 73. Here the lighting elements 70 are designed as a double-sided printed circuit board (PCB) 71, which has the LEDs 71 on the front surface, and the exposed conductor tracks 74 on the rear surface, which are preferably continuous over the length of the PCB. The rear surface can be designed with a thicker layer of copper, so that the conductor cross-section is sufficiently high to keep the voltage drop along the illumination profile sufficiently low, in particular, such that there is no noticeable loss of brightness.

Figures 3A, 3B, 3C:
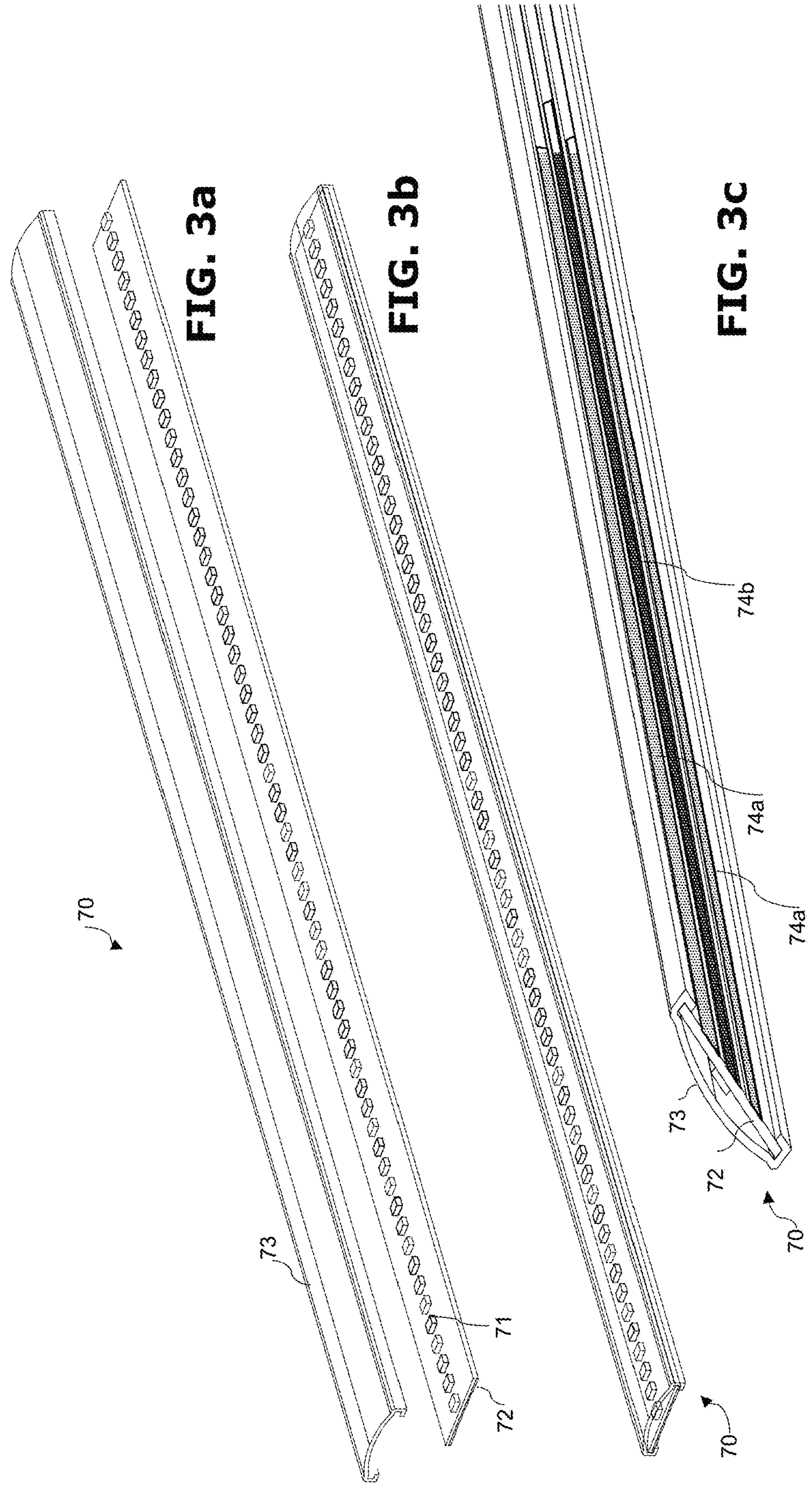
FIGS. 3*a* to 3*c* show views of an exemplary form of embodiment of a lighting element for an inventive illumination system.

FIG. 3*a* shows a form of embodiment of a lighting unit 70 in detail. Here a cover 73 made from a translucent plastic is shown, which can be designed to be clear, an optical element, or an optical diffuser. A long, flat PCB 72 with a series of LEDs 71, and also preferably with a control circuit for the latter, which is not shown here, is fitted on or in this cover. On the opposite side to the LEDs 71 there are at least two, preferably three, longitudinal conductor tracks 74, by way of which the LEDs are supplied with power. They are exposed and contact can therefore be established with them directly. The lighting unit can preferably be divided into a defined grid pattern (e.g. 5 cm, 7 cm, 10 cm, 15 cm), wherein each part can be operated autonomously. The dividing points can be marked-out, and/or provided with a predetermined breaking point. Preferably, the lighting unit can be divided without machining, that is to say, it can be cut with shears and/or fractured.

FIG. 3*b* shows the lighting unit of FIG. 3*a* in an assembled state, in which the PCB 72 is clipped, snapped, or pushed in under the cover 73.

FIG. 3*c* shows the same in a view from below onto the longitudinal conductor tracks 74. In the example shown 3 conductor tracks 74*a*, 74*b*, 74*c* are formed. In this form of embodiment, reverse polarity protection can be achieved, by the outer conductor tracks 74*a* and 74*c* carrying in each case a first pole of the supply voltage and the central conductor track 74*b* carrying a second pole of the supply voltage. This means that the lighting unit 70 or the supply connector 50*a* can be mounted in any position, and also rotated through 180 degrees without the risk of polarity reversal and damage to the lighting unit 70. Alternatively, there are also other arrangements and configurations of the contacts in the lighting unit 70 and/or the supply connector that can be used to prevent polarity reversal. The conductor track widths on the rear surface of the lighting unit are preferably designed such that their sum results in approximately the same conductor cross-section for each of the poles.

Figures 4A, 4B, 4C, 4D, 4E, 4F:
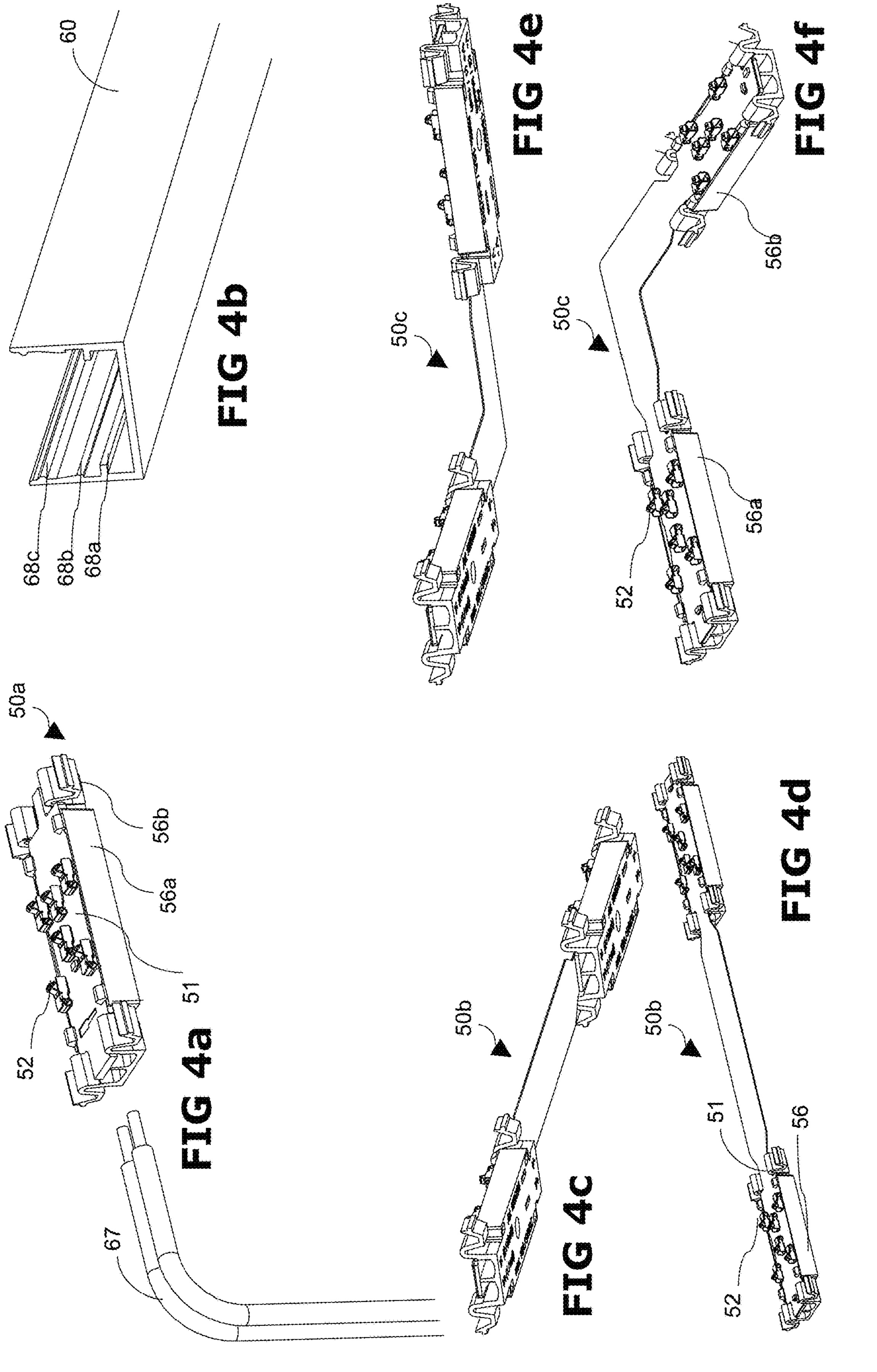
FIGS. 4*a* to 4*f* show views of an exemplary form of embodiment of various supply connectors of an inventive illumination system.

FIG. 4*a* shows a detailed view of a form of embodiment of an inventive electrical supply connector 50*a* from the contact surface or under surface, which is exposed when introduced into the profile. The latter has a cable outlet 67, that is to say, a terminal connection for the cable 67, spring contacts 52 on its under surface or contact surface facing the lighting unit, together with a connector housing with clip elements 56 as elements of its plastic housing for purposes of mechanical coupling with the mounting profile rail 60. Here the symmetrical arrangement of the spring contacts 52 can also be discerned.

With the supply connector 50*a* shown, contact can be established with a cable 67 by way of spring contacts 52 on the conductor tracks 74, (74*a*, 74*b*, 74*c*)—see also FIG. 2*c* and FIG. 3*c*. This form of embodiment of the electrical connector 50 is designed with a printed circuit board (PCB) 51, and a plastic housing as the connector housing. The PCB carries the spring contacts 52 and is fixed in the plastic housing, e.g. in a form fit or a force fit, either clipped or snapped-in, or bonded or moulded in. In an alternative form of embodiment, the electrical connector can also be designed as an over-moulded lead frame or as an MID (moulded interconnect device), or spatial circuit carrier, or as a plastic over-moulded module with an over-moulded lead frame. The plastic housing is primarily designed to be snapped onto the profile 60, in a subsequently releasable manner, by way of the clip-on or snap-on elements 56, or optionally also by magnets, so that contact is established between the spring contacts 52 and the conductor tracks 74*a*, 74*b*, 74*c*. The cable connections 53 for the cable 67 are shown here. In particular, these can be designed as solder contacts/pads and/or as spring-loaded terminals, or insulation displacement terminals, or as crimp connections, screw terminals, etc.

FIG. 4*b* shows a side view of a mounting profile rail; this is designed as a U-shaped long profile, which has continuous webs or grooves 68*a*, 68*b*, 68*c* on its side walls, which are designed to provide mechanical support for the supply connectors 50 (by way of 68*a*), lighting units 70 (by way of 68*b*) and the cover 69 (by way of 68*c*) that are introduced in the mounting profile rail 60.

FIG. 4*c* shows the electrical supply connector 50*b* as it is introduced downwards in the figure into a profile system. This has a first and a second end, that is to say, a left-hand and aright-hand end, the spring contacts 52 of which are in each case connected to each other lengthwise. This makes it possible to establish electrical contact between the rear conductor tracks 74 of a first lighting unit 70 and the first end, and between the tracks of a second lighting unit 70 and the second end. The rigid PCB can be configured to be continuous between the ends or, in another form of embodiment, a flexible connection can also be made, for example by way of cables or a flexible PCB.

FIG. 4*d* shows the supply connector 50*b* again from the other side. In this form of embodiment the spring contacts 52, and their electrical connections with a PCB 51 are implemented. In the example shown of a form of embodiment of such a PCB 51, the spring contacts 52 are shown in a view from the side of the lighting unit. These are embodied multiple times per electrical pole—twice in the example shown—in order to ensure a secure contact, and/or to provide a sufficient contact for the amperage to be transmitted. Here the arrangement of the spring contacts 52 is symmetrical about the (longer) central axis of the PCB 51, wherein the central spring contacts 52 carry a first pole of the supply voltage, and the second pole is connected to the outer spring contacts 52 on both sides. If the connecting element 50 is thus mounted, rotated through 180 degrees, the same polarity is obtained (reverse polarity protection).

FIG. 4*e* and FIG. 4*f* each show a view of a supply connector 50*c*, which is designed for a 90 degree corner connection. Here there is a 90 degree angled strip PCB 51, in each case with spring contacts 52 at either end. This allows connections to be made around a corner. Alternatively, other angles are, of course, also possible. Alternatively, two terminal connection supply connectors 50*a* can also be configured with cables to form a longitudinal or angled connector, with which any angle can be implemented, and/or any lengths of the supply connector can be implemented.

Figures 5A, 5B, 5C:
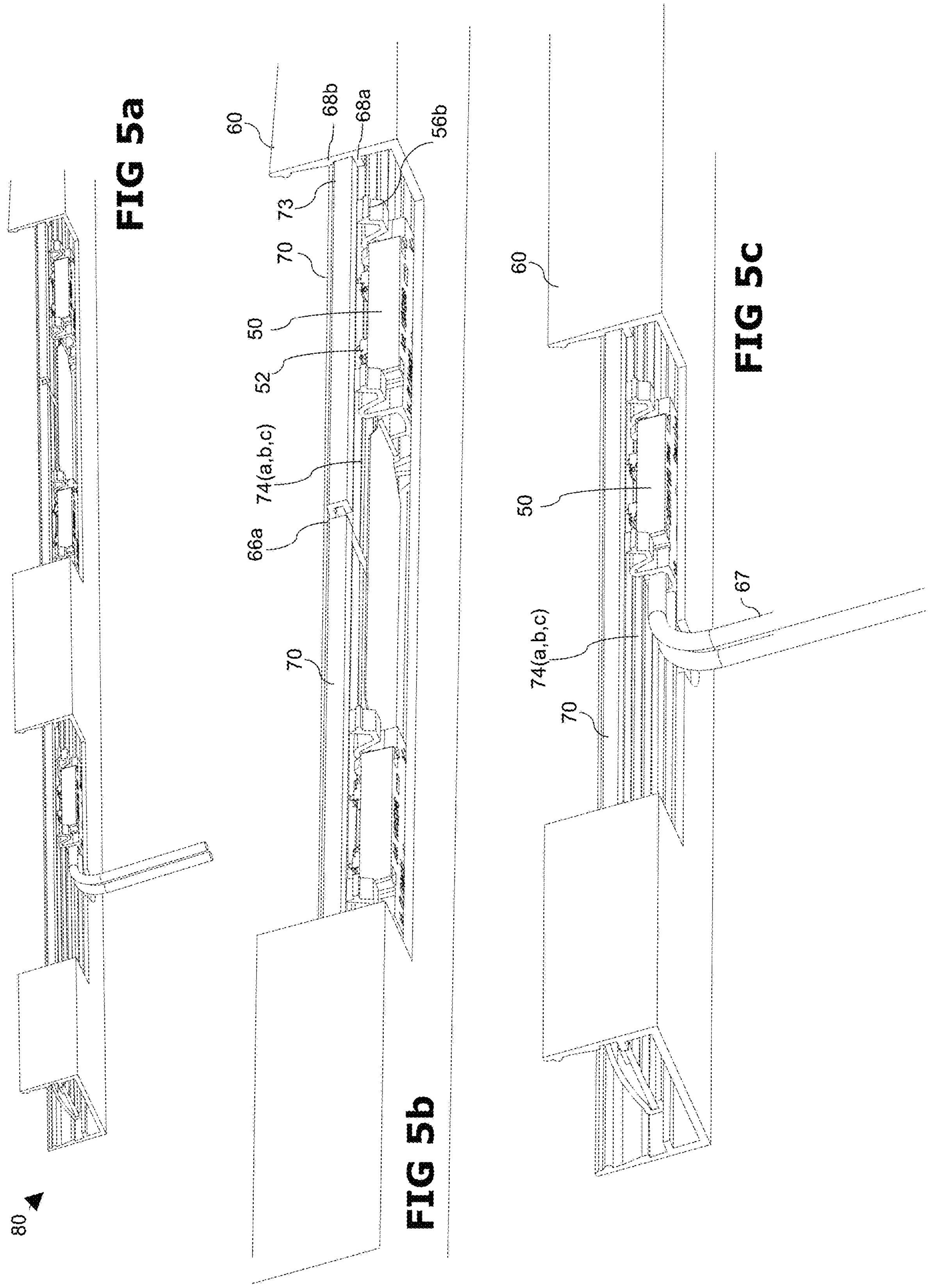
FIGS. 5*a* to 5*c* show views of an example of an inventive illumination system in an assembled state.

FIG. 5*a*, FIG. 5*b*, and FIG. 5*c* show an inventively equipped LED illumination system with the terminal connection side of the profile 60 facing downwards in the figures. These comprise an overview and two related detailed views. In each of the said detailed views of the profile 60, the supply terminal connection connector 50*a* or 50*b* is shown in a partial cross-sectional region. The lighting units 70 have three longitudinal conductor tracks 74*a*, 74*b* and 74*c*, which are open or exposed, and with which electrical contact can be established from the viewing side. In the example shown, the two conductor tracks 74*a* and 74*c* form a common pole for the supply to the lighting unit 70, and the central conductor track 74*b* forms a second pole. Since these in general have to carry the same current, their cross-sectional areas can be the same as shown, but their widths can be different, even though they are the same thickness. The conductor tracks are preferably symmetrically disposed about the longitudinal axis of the profile. In other embodiments, a reverse polarity protected arrangement in accordance with the invention can also have more than two poles, for example for purposes of controlling the switching state, colour, or brightness, for an illumination bus system.

Due to the reverse polarity protection of this inventive form of embodiment, the terminal connection side can be changed by turning the angled cable connection through 180°.

This is particularly important and advantageous in the case of profiles with mitre cuts (since these are then no longer symmetrical). This results in error minimisation and simplification for the customer, as there is no longer any need for sketches of how this must be produced on site.

Contact is made between the open longitudinal conductor paths 74_a_, 74_b_ and 74_c_ and supply connectors 50_a_ and 50_b_, one of which is used for power supply, and the other for electrical connection by way of a butt joint 66_a_ between two lighting units 70.

In the case of a single-colour LED (2-pole), for example, the LED series arrangement on the lighting unit is preferably connected with 0.75 $mm^2$ cable. The cross-section should be as large as possible in order to minimise the voltage loss along the cable. This is in contrast to the ever smaller LEDs/solder pads on the lighting units. If the LEDs are multi-coloured, e.g. RGB (4-pole) or RGBW (5-pole), it is almost impossible to use 0.75 $mm^2$. The cross-section must therefore be reduced in this case. Cables with a cross-section of 1.0-1.5 $mm^2$ would be ideal for cable lengths of up to 10 metres. As shown in the figures, this can be inventively achieved by using linear conductor tracks 74 on the rear of the lighting units, which are simply connected to the terminal connector 50 in the profile. In this way, a supply point can also be made at any/any point(s) of the lighting units or the profile with a connector 50, and at the same time the linear conductor tracks 74 also ensure the necessary conductor cross-sections, for which larger conductor cross-sections can also be implemented.

LIST OF REFERENCE SYMBOLS

50(_a, b, c_) Supply connector, electrical connector

51 PCB, printed circuit board, over-moulded lead frame, MID

52 Spring contact, contact device

53, 53_a_ Cable connection, spring-loaded terminal, solder contact/pad

56 Clip element, connector housing, connector retaining clip, clip

60(_a, b, c_) Mounting profile rail, profile, LED illumination profile

61 Terminal connection side, profile rear side

66_a_ Straight profile connection, butt joint

66_b_ Angled profile joint, corner joint, mitre joint

67 Cable outlet, cable

68_a, b, c_ Groove or web on profile side wall, or side wall of the profile

69 Light cover, cover, light screen, diffuser

70 Lighting unit, LED board,

71 LED (front surface)

72 LED print, LED circuit board

73 Cover, diffuser, housing element

74(_a, b, c_) Conductor track, longitudinal conductor track (rear surface)

80 Electrical LED connection system, connection set

85 Roll

86 Separation or cutting tool, cable duct shears

The invention claimed is:

1. An illumination system comprising:

at least one mounting profile rail (60_a_, 60_b_, 60_c_), without a power rail, for the accommodation of at least one lighting unit (70), which can be introduced into the mounting profile rail, and at least one supply connector (50_a_, 50_b_, 50_c_), which can be introduced into the mounting profile rail;

wherein the mounting profile rail (60_a_, 60_b_, 60_c_) is designed as an extruded plastic or aluminum profile, wherein the at least one lighting unit (70) is designed as a long, rigid strip, on a front surface of which it has at least one semiconductor light source, and on its rear surface it has at least two exposed, continuous contacting conductor tracks, wherein the at least one lighting unit (70) furthermore comprises a translucent housing element (73), which is designed such that it can be mechanically coupled to the mounting profile rail, and with which the lighting unit can be held in the mounting profile rail, wherein the supply connector (50_a_, 50_b_, 50_c_) has contact devices for making an electrical coupling of the contacting conductor tracks of the lighting unit with those of a second lighting unit, and/or with a supply cable, and wherein the supply connector (50_a_, 50_b_, 50_c_) furthermore comprises a housing element, which can be mechanically coupled to the mounting profile rail (60_a_, 60_b_, 60_c_) or to the at least one lighting unit (70), and with which the supply connector is retained in the mounting profile rail.

2. The illumination system in accordance with claim 1, wherein the illumination system is designed such that supply connectors (50_a_, 50_b_, 50_c_) introduced into the mounting profile rail (60_a_, 60_b_, 60_c_), and a plurality of lighting units (70), which are also subsequently introduced into the mounting profile rail, electrically interconnect with one another in the mounting profile rail, wherein the supply connectors and lighting units can in each case be arranged to overlap each other within the mounting profile rail.

3. The illumination system in accordance with claim 1, wherein the housing element of the lighting unit (70) is designed as a diffuser (69, 73), or linear optics, and/or is designed as contact protection (ESD) and mechanical protection for the electronic components.

4. The illumination system in accordance with claim 1, wherein both the supply connectors (50_a_, 50_b_, 50_c_) and the at least one lighting unit (70) are mechanically connected to the mounting profile rail (60_a_, 60_b_, 60_c_), but not to each other.

5. The illumination system in accordance with claim 1, wherein the at least one lighting unit (70) is designed as a two-sided rigid PCB with the at least one semiconductor light source and a control circuit.

6. The illumination system in accordance with claim 1, wherein the at least one lighting unit (70) is designed as a two-sided rigid PCB, the PCB of the at least one lighting unit (70) has on the rear surface a first conductor track layer thickness, which is greater than that on the front surface, and/or wherein the at least one lighting unit (70) is designed such that it can be shortened in a predetermined grid pattern by blades that can be moved relative to each other, wherein each grid element can be operated on its own autonomously.

7. The illumination system in accordance with claim 1, wherein the supply connector (50*a*, 50*b*, 50*c*), when introduced onto the mounting profile rail (60*a*, 60*b*, 60*c*), can be moved in a longitudinal direction of the mounting profile rail.

8. The illumination system in accordance with claim 1, wherein the supply connector-contacting conductor track pairing is protected against polarity reversal.

9. The illumination system in accordance with claim 1, wherein the supply connector (50*a*, 50*b*, 50*c*), in the longitudinal direction of the mounting profile rail (60*a*, 60*b*, 60*c*), has in each case at least a first and a second electrically interconnected spring contact (52).

10. The illumination system in accordance with claim 1, wherein at least one of the supply connectors (50*a*, 50*b*, 50*c*) is designed as a corner supply connector with an angle of 90°, whereby the lighting units (70) in two mounting profile rails (60*a*, 60*b*, 60*c*) can be connected around a corner.

11. The illumination system in accordance with claim 1, wherein at least one of the supply connectors (50*a*, 50*b*, 50*c*) is a flexible supply connector (58), in which there is a flexible cable connection (53) between a first supply connector end and a second supply connector end.

12. The illumination system in accordance with claim 1, wherein at least one of the supply connectors (50*a*, 50*b*, 50*c*) has as a terminal connection unit a spring-loaded terminal (53*a*), or an insulation displacement terminal for a cable, and is designed to connect the lighting unit electrically to a terminal connection cable from a power supply.

13. The illumination system in accordance with claim 1, wherein the supply connector (50*a*, 50*b*, 50*c*) has a further housing element, which is designed to produce a geometrically defined mechanical coupling between two mounting profile rails (60*a*, 60*b*, 60*c*).

14. The illumination system in accordance with claim 1, wherein the illumination system comprises at least one separate profile connector (66*a*, 66*b*), that provides a geometrically defined mechanical coupling between two mounting profile rails (60*a*, 60*b*, 60*c*).

15. An illumination system comprising:

at least one mounting profile rail (60*a*, 60*b*, 60*c*), without a power rail, for the accommodation of at least one lighting unit (70), which can be introduced into the mounting profile rail, and at least one supply connector (50*a*, 50*b*, 50*c*), which can be introduced into the mounting profile rail;

wherein the mounting profile rail (60*a*, 60*b*, 60*c*) is designed as an extruded plastic or aluminum profile, wherein the at least one lighting unit (70) is designed as a long, rigid strip, on a front surface of which it has at least one semiconductor light source, and on its rear surface it has at least two exposed, continuous contacting conductor tracks, wherein the at least one lighting unit (70) furthermore comprises a translucent housing element (73), which is designed such that it can be mechanically coupled to the mounting profile rail, and with which the lighting unit can be held in the mounting profile rail, wherein the supply connector (50*a*, 50*b*, 50*c*) has contact devices for making an electrical coupling of the contacting conductor tracks of the lighting unit with those of a second lighting unit, and/or with a supply cable, and wherein the supply connector (50*a*, 50*b*, 50*c*) furthermore comprises a housing element, which can be mechanically coupled to the mounting profile rail (60*a*, 60*b*, 60*c*) or to the at least one lighting unit (70), and with which the supply connector is retained in the mounting profile rail, wherein the electrical supply connector (50*a*, 50*b*, 50*c*) has, a PCB (51), or an over-moulded lead frame (51), with at least two spring contacts (52) on an under surface, a cable outlet (67) with at least two cable connections (53) on an upper surface, and a retaining element (56) which is designed to:

snap onto a profile system (60); or magnetically attach to a profile system.

16. The illumination system in accordance with claim 15, wherein the spring contacts (52) of the supply connector (50*a*, 50*b*, 50*c*) are protected against polarity reversal.

17. The illumination system in accordance with claim 15, wherein the cable connections (53) of the supply connector (50*a*, 50*b*, 50*c*) are formed as spring-loaded terminals, insulation displacement terminals, and/or soldering lands, on the PCB (51) or over-moulded lead frame.

18. The illumination system in accordance with claim 1, wherein the illumination system comprises an electrical connector element, consisting of two supply connectors (50), that are connected to at least one cable (69), designed to establish an electrical connection between two lighting units.

19. The illumination system in accordance with claim 1, wherein the illumination system comprises an electrical connector element with an over-moulded lead frame, or a PCB (51), with at least a first group of two spring contacts (52) on an under surface, and a second group of two spring contacts (52) on the under surface, which in each case are electrically connected to respectively associated spring contacts of the first group, and a retaining element (56) which is designed to snap onto the mounting profile rail, such that the first group establishes contact with a first terminal connection element (74) of the at least one lighting unit (70), and the second group establishes contact with a second terminal connection element (74) of a second lighting unit (70), and in an installed state electrically connects them to one another.

20. The illumination system in accordance with claim 1, wherein at least a first and a second longitudinal web or longitudinal groove is formed on each side face of the mounting profile rail (60*a*, 60*b*, 60*c*), wherein the first is designed for the mechanical accommodation of the supply connector (50*a*, 50*b*, 50*c*) and the second is designed for the accommodation of the lighting unit (70).

21. The illumination system in accordance with claim 3, wherein an additional diffuser (79, 73) is mounted in front of the lighting unit (70), in or on the mounting profile rail (60*a*, 60*b*, 60*c*).

22. A method for installation or connection of an LED illumination system to a supply voltage, comprising:

installing one or a plurality of mounting profile rails (60*a*, 60*b*, 60*c*) of the illumination system at an installation site;

introducing at least one electrical supply connector (50*a*, 50*b*, 50*c*) onto the mounting profile rail, wherein at least one of the supply connectors is connected to a supply cable (67), and the supply connector can be moved in the longitudinal direction of a profile of the profile rail;

introducing at least one lighting unit (70) onto the mounting profile rail (60*a*, 60*b*, 60*c*), above the supply connector (50*a*, 50*b*, 50*c*), so that the latter establishes contact with a continuous, rear surface, supply conductor track (74) of the lighting unit, wherein the lighting units are shortened at least in a predetermined grid pattern, and/or are butted against one another lengthwise, so as to adapt them to the length of the profile, wherein a supply connector is introduced beforehand at each of the butt joints, such that it overlaps both abutting lighting units;

mounting a translucent cover (69, 73) on the mounting profile rail (60*a*, 60*b*, 60*c*).

* * * * *